Sept. 13, 1949.   C. W. McCOY   2,482,016
IGNITION TESTER
Filed March 25, 1946   2 Sheets-Sheet 1
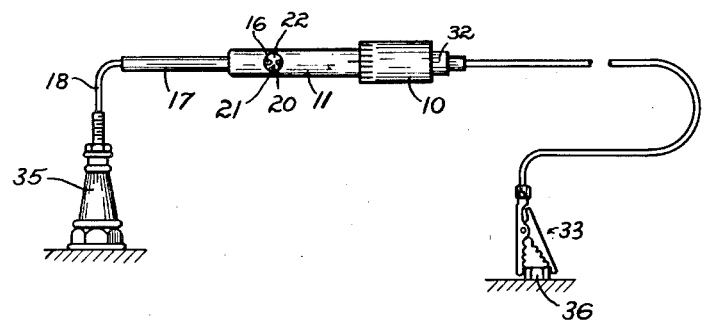
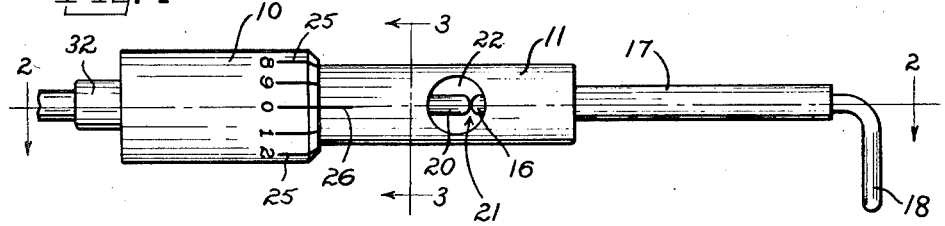
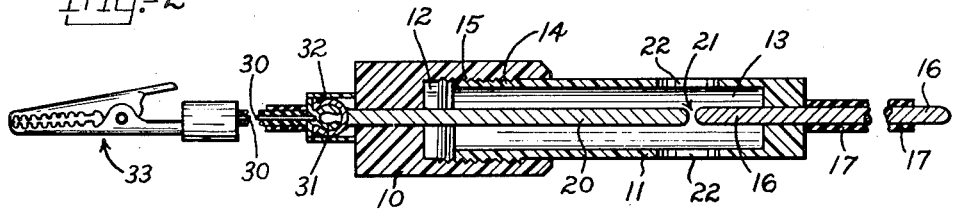
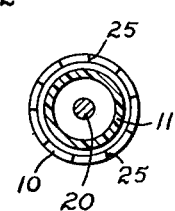
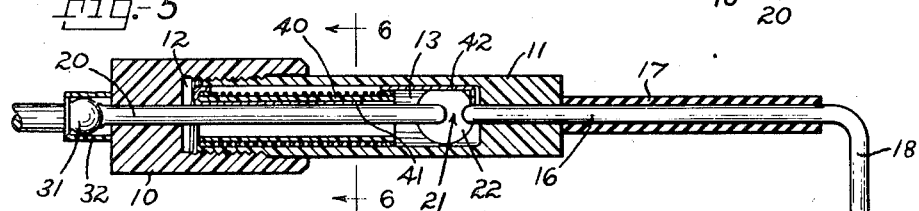
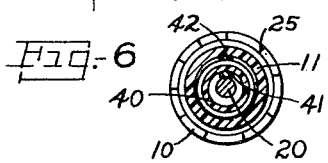
INVENTOR.
Charles W. McCoy
BY
Marechal & Biebel
ATTORNEYS Sept. 13, 1949.   C. W. McCOY   2,482,016
IGNITION TESTER
Filed March 25, 1946   2 Sheets-Sheet 2
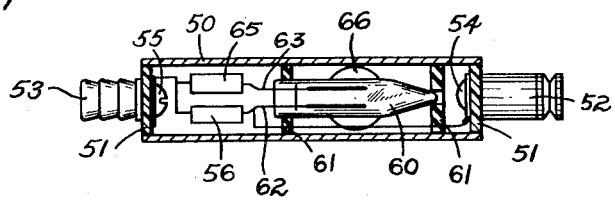
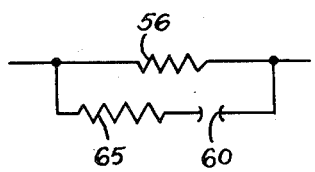
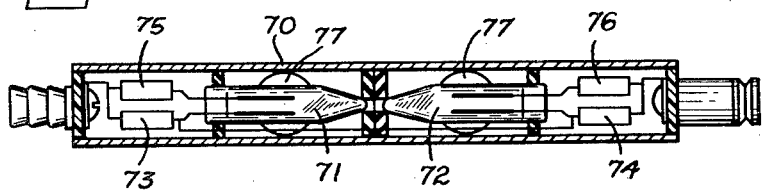
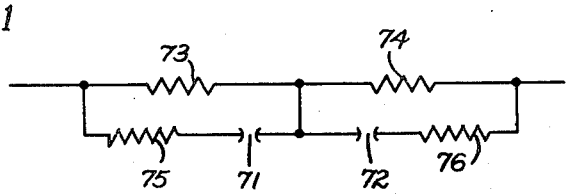
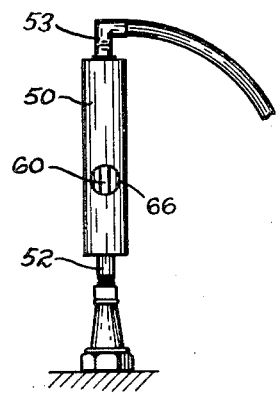
INVENTOR.
Charles W. McCoy
BY
Marechal & Biebel
ATTORNEYS Patented Sept. 13, 1949

2,482,016

UNITED STATES PATENT OFFICE 2,482,016

IGNITION TESTER

Charles W. McCoy, Dayton, Ohio

Application March 25, 1946, Serial No. 656,791

11 Claims. (Cl. 175—183)

This invention relates to devices for testing the ignition system of an internal combustion engine or the like.

One of the principal objects of the invention is to provide a simple, inexpensive and accurate device for use in testing the ignition system of an internal combustion engine such as that in an automobile.

Another object is to provide such a testing device which may be used in different ways for measuring the efficiency of different component parts of an ignition system, including the spark plugs, the distributor, the coil and the leads connecting these parts.

It is also an object of the invention to provide such a device which is capable of use for measuring the relative compression of the various cylinders of an automobile or like internal combustion engine.

A further object is to provide a device of the above type which may by slight adjustment be applied selectively to the direct measurement of either peak voltage or peak current at different points in the ignition system of an internal combustion engine.

An additional object is to provide a testing device of the above type wherein the measurement of the voltage drop across a resistance in the high voltage circuit of an ignition system is used as a measurement of peak current.

Still another object is to provide a testing device of this character so constructed that it may be freely used in testing the ignition system of an internal combustion engine without danger of electric shock to the user.

Other objects and advantages of the invention will be apparent from the following description, the accompanying drawings and the appended claims.

In the drawings, in which like characters of reference designate like parts throughout—

Fig. 1 is a view in side elevation illustrating a testing device in accordance with the present invention;

Fig. 2 is a view in longitudinal section taken on the line 2—2 in Fig. 1 and showing the device as constructed for use as a voltmeter;

Fig. 3 is a transverse section taken on the line 3—3 in Fig. 1;

Fig. 4 is a more or less diagrammatic view illustrating the use of the testing device of the present invention;

Fig. 5 is a sectional view similar to Fig. 2 but showing the device as having a resistance coil inserted therein to adapt it for use as a milliammeter;

Fig. 6 is a transverse section taken on the line 6—6 of Fig. 5 and showing the spring contacts between the resistance coil and the electrode;

Fig. 7 is a sectional view similar to Fig. 5 showing a testing device embodying another form of the invention and wherein an indicator bulb is used for comparative measurement of peak current;

Fig. 8 is a diagram of the wiring of the device shown in Fig. 7;

Fig. 9 is a diagrammatic view similar to Fig. 4 illustrating the use of the device shown in Fig. 7;

Fig. 10 is a sectional view similar to Fig. 7 illustrating a further modification of the invention wherein a plurality of indicator bulbs is used; and Fig. 11 is a diagram of the wiring of the device shown in Fig. 10.

Referring to the drawings, which disclose preferred embodiments of the invention, body members 10 and 11 are shown in Figs. 1 to 3 as formed of hard rubber or other suitable non-conducting material and each is formed with a hollow central chamber 12—13 open at one end. Body member 11 is threaded at 14 for telescoping engagement with the tapped sides 15 of chamber 12 in member 10. An electrode 16 of stainless steel or other suitable material is mounted to extend through the closed end of body member 11 into chamber 13 and centrally of such chamber. Electrode 16 is fixed in body member 11 against axial movement and is provided along the greater part of its length externally of the body member with an insulating sleeve 17 of rubber or like material. The outer end of electrode 16 is shown as formed at 18 to provide a hooked portion the purpose of which will be described hereinafter.

A second electrode 20 is mounted in the closed end of body member 10 in a suitable way such that it will be held against axial movement with respect to the body member such as by being directly molded in place. This electrode 20 is so positioned and extends sufficiently far into the composite chamber 12—13 for it to be brought into direct end to end contact with electrode 16 by axial adjustment of the two body members at their engaging threaded portions 14—15. Thus when the two body members are rotated with respect to each other in such manner as to move the electrodes axially apart, there is provided a spark gap indicated generally at 21, the length of which may be adjusted from a minimum of zero to whatever maximum the testing conditions may require. An aperture 22 is provided extending transversely through body member 11 and overlying the inner end of electrode 16 to provide for ready viewing of spark gap 21 and for free circulation of air therethrough.

Body member 10 is provided with a plurality of indicia 25 circumferentially arranged about its end adjacent body member 11 and forming a scale cooperating with an index mark 26 on body member 11, which scale may be calibrated in electrical units in accordance with the length of spark gap 21. For example, very satisfactory results have been obtained with the device constructed as described and shown in Figs. 1 to 3, with indicia 25 arranged in spaced relation to provide ten subdivisions of the outer circumference of body member 10 and with the diameter of threaded body portion 14 and the pitch of these threads such that each of said subdivisions of scale 25 will represent one kilovolt.

A suitably insulated wire 30 is secured to the outer end of electrode 20, preferably by means of a swiveled connection as shown at 31 to permit free manipulation of the device without imparting twist to the wire such as might result in undesirable stresses, this swiveled connection being enclosed within a suitable short sleeve 32 of insulating material. A spring clip 33 is soldered or otherwise secured in electrical contact with the other end of wire 30 to provide convenient means for connecting with a ground in the use of the device.

Fig. 4 shows the device in use for testing a spark plug 35 and the compression of its associated cylinder. For this purpose, clip 33 is first connected with a good ground on the engine, such as the head bolt indicated at 36, and the engine is warmed up adequately and permitted to idle. Hooked end 18 of electrode 16 is then pressed into firm contact with the terminal of spark plug 35, without disturbing the connection of the usual lead thereto from the distributor, and spark gap 21 is adjusted by relative rotation of body members 10 and 11 to the maximum length which is continuously jumped by a spark. Under these conditions, the reading of scale 25 opposite index mark 26 will give the peak voltage for the spark plug. This same procedure can be followed for each spark plug in the engine and the voltages accurately measured and recorded; if these values differ to an appreciable extent the same tests can be repeated for each plug with the engine speeded up to a higher speed such as approximately 1800 R. P. M. Comparison of results will show which if any of the plugs are not firing properly.

The above tests will give an accurate indication of the operating conditions of both the spark plugs and the cylinder compression. If the voltage of any particular plug is low at all speeds, this indicates a fouled plug or a narrow gap between the points of the plug, whereas if the voltage is low at idling but improves as the engine is speeded up, this indicates faulty compression in the cylinder. In either case, the plug should be replaced with another known to be good and the same tests repeated to determine whether the fault lay in the original plug or in the cylinder. If all the plugs have their gaps exactly the same and are free from short-circuits, the peak voltages recorded in the above tests will be directly in proportion to the compression in the cylinders. Conversely, if the compression is uniform in all cylinders, the peak voltages recorded as above described will be directly in proportion to the length of the gaps in the individual spark plugs, and it is accordingly important to read the values on the device accurately for each test. It follows, therefore, that with the device constructed as described and by means of the test just described, it is possible to measure easily and accurately the efficiency of each individual plug and the compression efficiency of each cylinder.

The device of the invention is also applicable to testing the efficiency of the parts of the ignition system leading to the spark plugs and including the distributor, the coil, and the various connections therebetween. For this purpose it is desirable to loosen the terminal of each spark plug before the engine is started, in order to facilitate disconnection of the spark plug leads while the engine is running and at the same time to avoid possible electric shock. Clip 33 is grounded as in the first example, and the two body members are adjusted to provide a predetermined length for spark gap 21, for example 10 kv. for a low compression engine and 15 kv. for a high compression engine. Next, the lead to one spark plug is disconnected from its plug with hooked end 18 of electrode 16 in such manner that the lead remains in electrical contact with the electrode, thus providing a grounded connection through the device from the distributor and spark plug lead. If the spark continuously jumps gap 21, this indicates that the coil, distributor and connecting leads to the plug satisfactorily pass the high voltage test. The same test should be made on each spark plug wire, and if the results are uniformly good, this indicates that all parts of the ignition system up to the plugs satisfactorily stand the test voltage.

If in the above test the spark does not jump at all or fails to jump continuously, this indicates a defective connection somewhere in the circuit, and by closing gap 21 until the spark jumps continuously it is possible to measure the voltage break-down value of the defective part. If the spark jumps the predetermined gap for some leads but not others, this indicates the particular lead or leads are defective at some point between the distributor and spark plug. If the spark fails to jump the predetermined gap for all leads, this indicates that either the coil, the distributor or the connections between the coil and distributor are defective, and further tests of them will readily run down the individual defective part. For this purpose it is desirable to measure the current output of the coil, and the device of the invention is equally applicable to this testing upon conversion to a milliammeter by connecting a resistance in shunt across the spark gap.

Figs. 5 and 6 illustrate convenient means for so converting the device to use as a milliammeter. As shown, a coil 40 or other suitable electrical resistance device may be inserted within the annular space provided in chambers 12 and 13 by the central positioning of the two electrodes 16 and 20. For example, a coil having a resistance value of 100,000 ohms has been found to give satisfactory results for the purpose of the invention. Coil 40 is provided at each end with a contact element, 41 and 42 respectively, for making electrical connection with the adjacent electrode without interfering with relative rotation of the body member and electrodes. For example, as is shown particularly in Fig. 6, contact element 41 extends from the outer part of coil 40 into its hollow core and is formed of springy material such that it will readily engage in electrical contact with electrode 20 when the latter is inserted in said core. Contact element 42 is similarly formed but extends beyond the end of the coil in order to engage electrode 16 across gap 21 without interfering with the view of the gap through apertures 22. This construction provides for ready insertion and removal of coil 40 within the body members and also insures maintaining contact between these contacts 41 and 42 and the electrodes 16 and 20 during relative rotation of the latter with the body members. Since this construction results in connecting the resistance device 40 in shunt with spark gap 21, it acts to convert the device from a voltmeter to a milliammeter in a manner analogous to the conversion of a millivoltmeter into an ammeter by connecting a resistance in shunt with the voltmeter and calibrating in amperes the measurement by the latter of the voltage drop across the shunt.

For testing with the device converted as shown in Figs. 5 and 6, clip 33 is connected to ground as before and the spark plug leads are loosened as in the above test thereof. Each spark plug lead in turn is again disconnected from its plug by means of electrode tip 18 and thus connected to ground through the test device. Gap 21 is then adjusted by relative rotation of the body members to the widest gap which will be continuously jumped by the spark while the engine is idling. Under these conditions the reading of scale 25 will give the peak current output in milliamperes of the coil at a fixed load, with the unit being ten milliamperes using the same graduations for scale 25 as described in connection with Figs. 1-3. In operation, the current output from the coil depends upon the power input to the coil, i. e., the current to the primary of the coil is dependent upon voltage across the coil. Voltage losses can be caused by such defective parts as burned breaker points, dirty or corroded connections or rusted washers, and it is accordingly possible by means of the device of the invention to measure current output directly and thus ascertain readily and simply whether or not the ignition system is functioning normally.

After the above test is completed at idling for each spark plug lead, it should be repeated with the engine operated at a substantially higher speed. Under normal conditions the current measured as described will decrease to not more than 50% of its value at idling, owing to the fact that sparks occur so rapidly at higher speeds that the coil action of one overlaps that of others. If with the test device connected as described, the current decreases to a value less than normal, this indicates that defective breaker point action or clearances are responsible. That is to say, if the springs are weakened or if the distributor cams are worn or the points badly adjusted, the overlapping of the coil action becomes worse than normal. This weaker spark at high speeds causes erratic operation of the engine. Thus the device will by means of this test indicate not only whether or not the coil is functioning normally, i. e., in accordance with its proper specifications as predetermined but also whether or not the distributor is functioning properly. The results of these tests will quickly inform a mechanic as to the parts which require adjustment or replacement.

The embodiments of the invention shown in Figs. 7 to 11 are similar in operation and principle to the device constructed as shown in Figs. 5 and 6 and similarly serve for measuring peak current. However, instead of a spark gap as the visual indicator of current flow, these devices utilize one or more indicator lamps connected in parallel with a resistor and provide for determining the current value in accordance with the intensity or brilliance of illumination of the lamp or lamps.

In Fig. 7, the body 50 of the instrument comprises a hollow shell of suitably rigid material such as brass giving adequate protection and shielding of the internal parts of the device from electrostatic fields. Each end of body 50 is provided with a plug 51 of insulating material, and each of these plugs in turn carries a suitable exposed terminal such as a standard connection 52 for attachment to a spark plug terminal and a standard connection 53 for attachment to a spark plug wire. These terminals are secured to plugs 51 by means of suitable screws or rivets 54 and 55 extending through plugs 51 to provide electrical terminals within the body chamber, and a resistor 56 is connected between these terminals.

Element 60 represents an indicator lamp of suitable electrical characteristics, a satisfactory example being a neon glow tube, General Electric type NE-2, and this tube 60 is mounted within body 50 by rubber rings 61 or the like which give suitable protection and support for the tube as shown. This tube 60 is connected as shown in Fig. 8 in parallel with resistor 56, one lead 62 from the tube connecting between resistor 56 and internal terminal 54, and the other lead 63 of the tube being connected to terminal 55 through a suitable voltage stabilizing resistor 65. Body 50 is also provided with one or more suitable apertures 66 for viewing lamp or tube 60.

When the device constructed as above described and shown is connected in an electrical circuit by means of terminals 52 and 53, as current flows through resistor 56 a voltage proportional to the current will be impressed across the neon tube 60 to cause it to light up, and as this current varies, the intensity or brilliance of the tube will similarly vary. Furthermore, a neon glow tube has a predetermined voltage rating for normal brilliance, and application of different voltages to the tube will result in different degrees of brilliance above and below the normal level, so that different degrees of brilliance in the tube will indicate different conditions in an ignition system tested with the device. For example, satisfactory results in testing the ignition system of an automobile have been obtained utilizing at 56 a 10,000 ohm ¼ watt resistor and at 65 a 200,000 ohm ¼ watt resistor.

To test the ignition system of an internal combustion engine in a manner comparable to that just described in connection with the embodiment of the invention shown in Figs. 5 and 6, the device is directly connected in the circuit between the distributor and spark plug as shown in Fig. 9, and the engine is warmed up and then permitted to idle. With the device constructed as above described, if the ignition system is functioning normally, tube 60 will glow at normal brilliance, but if the spark is weaker than normal, the glow of the tube will be correspondingly weaker. On the other hand, if the distributor points are improperly adjusted, the tube will still glow normally at idling but at high speeds will glow dimly dependent upon the ignition overlapping of the coil. In this manner and by testing each spark plug both at idling and higher speed and observing the brilliance with which tube 60 glows, the operator can readily determine and analyze the spark conditions as explained in connection with the device as shown in Figs. 5 and 6.

Figs. 10 and 11 illustrate a modification of the device as just described wherein two indicator bulbs are used and are so connected that when the device is connected in a circuit, the relative intensity or brilliance of the two tubes serves as a measure of peak current. In Figs. 10 and 11, body member 70 is similar to body 50 in Fig. 7 but is sufficiently longer to accommodate two tubes 71 and 72 similar to tube 60 in Fig. 7. Resistors 73 and 74 correspond to resistor 56 in Fig. 7 and are connected in series with the exposed terminals, and resistors 75 and 76 similarly correspond to resistor 65 in Fig. 7. Resistors 73 and 74 are preferably of different values. For example, resistor 73 may have a value of 10,000 ohms and resistor 74 a value of approximately 2,500 ohms. Tubes 71 and 72 are connected across these resistors 73 and 74 respectively, as shown in Fig. 11, and body 70 is provided with a plurality of viewing apertures 77 to provide for simultaneous viewing of both tubes 71 and 72.

The device constructed as shown in Figs. 10 and 11 provides an extended testing range as compared with the device constructed as shown in Figs. 7 and 8. When the device is connected in the same manner as that shown in Fig. 9, normal brilliance or intensity of both tubes will indicate normal current output, but a noticeable difference in intensity between the two tubes indicates subnormal ignition conditions. For example, if one tube is very dim or out but the other glows normally, this indicates that the peak current is not more than one half the normal value, and if one tube is very dim and the other tube is out this indicates that the coil output is seriously weak and that corrective measure should be taken to restore it to normal.

The invention thus provides simple and accurate devices for testing the component parts of an ignition system and which are effective not only for indicating the efficiency of the system but also for quickly and accurately locating defective or otherwise inefficient individual parts. They may be readily used by even an unskilled mechanic with satisfactory results and without danger of injury to either the system or the operator, since adequate provision is made for insulation against shock even from relatively careless handling of the device in use. The devices are simple and inexpensive to manufacture and rugged in use. They contain no delicate parts or fine adjustments of the type usually required in such instruments, and under normal service conditions with moderate care there is minimum danger of injury to any portion of the device, or danger of shock to the user. These and other structural and operational advantages which will be apparent to those skilled in the art make the devices ideally suited both for regular garage use and also for inclusion in the tool kit of an automobile for emergency use in the event of a breakdown in the ignition system.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A testing device of the character described for use in testing an ignition system comprising, in combination, a hollow body member having an elongated chamber therein open at one end thereof, a second body member mounted for adjustable telescoping movement with respect to said open end of said hollow body member, electrodes carried by said body members providing a spark gap within said chamber adjustable in accordance with relative movement of said body members, said electrodes being of substantially smaller diameter than said chamber to leave an annular space of substantial cross-sectional area within said chamber when said body members and electrodes are in assembled relation, means providing an exposed terminal for one of said electrodes, means providing for grounding the other of said electrodes, and a scale arranged on one of said body members cooperating with an index marker carried by the other of said body members and calibrated directly in electrical units in accordance with the maximum length of said spark gap continuously jumped by a spark under predetermined operating conditions.

2. A testing device of the character described for use in testing an ignition system comprising, in combination, a pair of hollow body members connected for relatively rotational telescoping adjustment, electrodes carried by said body members respectively providing a spark gap within said body members adjustable in accordance with relative movement of said body members, said electrodes being of smaller diameter than the inner diameters of said body members to leave an annular space of substantial cross-sectional area within said body members, means providing an exposed terminal for one of said electrodes, a lead for readily grounding the other of said electrodes, means forming a swivel connection between said lead and said other electrode, and a scale carried by one of said body members cooperating with an index marker carried by the other of said body members and calibrated to show directly the peak voltage developed across said spark gap when said electrodes are adjusted to the maximum gap continuously jumped by a spark.

3. A testing device of the character described for use in testing an ignition system comprising, in combination, a hollow body member having a chamber therein, a pair of terminals projecting from said body and extending into said chamber adapted to be connected in the ignition circuit, an electrical resistance of predetermined value within said chamber and connected to said terminals, and means providing an adjustable spark gap within said body connected to said terminals in parallel with said resistance for measuring the ignition current passing through said resistance with said gap adjusted to the maximum length continuously jumped by a spark.

4. A testing device of the character described comprising, in combination, a pair of hollow body members adapted for adjustable telescoping engagement, electrode means carried by said body members providing a spark gap within said body members adjustable in accordance with relative movement of said body members, means providing an exposed terminal for one of said electrodes, means providing for readily grounding the other of said electrodes, an electrical resistance device adapted for insertion in said hollow body members, terminal means on said resistance adapted upon insertion in said body members for automatic contact with said electrodes in shunt across said gap, and scale means arranged on one of said body members cooperating with an index marker carried by the other of said body members, said scale means including a single set of indicia calibrated to determine the peak voltage developed across said spark gap with said electrodes adjusted to the maximum gap continuously jumped by a spark with said resistance disconnected and to determine the peak current passing through said resistance device when the resistance device is connected in shunt with said spark gap and with said electrodes adjusted to the maximum gap continuously jumped by a spark.

5. A testing device of the character described comprising, in combination, a body member having a hollow central chamber open at one end, an electrode mounted in the closed end of said body member and extending into the chamber therein, a second body member adapted for threaded telescoping engagement with said first named body member and having an electrode therein providing with the other of said electrodes a spark gap adjustable in accordance with the relative rotation of said body members at the threaded connection therebetween, means providing a transverse aperture through one of said body members for viewing said spark gap, an electrical resistance unit adapted to be positioned in said hollow chamber of said body member, and terminal means at opposite ends of said resistance adapted upon insertion in said chamber for contact with said electrodes in shunt across said gap.

6. A testing device of the character described comprising, in combination, a pair of hollow body members adapted for adjustable telescoping engagement, electrode means carried by said body members providing a spark gap within said body members adjustable in accordance with relative movement of said body members, means providing an exposed terminal for one of said electrodes, means providing for readily grounding the other of said electrodes, an electrical resistance device adapted to be positioned within said body members, means for removably connecting said resistance to said electrodes in shunt across said gap, and scale means arranged on one of said body members cooperating with an index marker carried by the other of said body members, said scale means including a single set of indicia calibrated to determine the peak voltage developed across said spark gap with said electrodes adjusted to the maximum gap continuously jumped by a spark with said resistance disconnected and to determine the peak current passing through said resistance device when the resistance device is connected in shunt with said spark gap and with said electrodes adjusted to the maximum gap continuously jumped by a spark.

7. A testing device of the character described comprising, in combination a pair of body members adapted for threaded telescoping engagement with each other, each of said body members having a hollow central chamber open at its end adjacent the other said body member, each of said body members having an electrode mounted in the closed end thereof and extending into the chamber therein, said electrodes providing a spark gap adjustable in accordance with the relative rotation of said body members at the threaded connection therebetween, means providing a transverse aperture through one of said body member and overlying the inner end of the electrode in said body member for viewing said spark gap, means providing an exposed terminal for the outer end of one of said electrodes, grounding means connected at one end with the outer end of the other of said electrodes and having connector means at its other end, an electrical resistance device mounted in said chamber and connected with each of said electrodes in shunt across said spark gap, and cooperating scale means carried by said body members for interpreting the conditions under test in accordance with the maximum length of said spark gap jumped by a spark under predetermined operating conditions.

8. A testing device of the character described comprising, in combination, a pair of body members adapted for threaded telescoping engagement with each other, each of said body members having a hollow central chamber open at its end adjacent the other said body member, each of said body members having an electrode mounted in the closed end thereof and extending into the chamber therein, said electrodes being of substantially smaller diameter than said chamber in each of said body members to leave an annular space of substantial cross-sectional area within each said chamber, said electrodes cooperating to form a spark gap adjustable in accordance with the relative rotation of said body members at the threaded connection therebetween, means providing a transverse aperture through one of said body members and overlying the inner end of the electrode in said body member for viewing said spark gap, one of said electrodes extending out from its said body member and providing a rigid exposed terminal spaced from said body member, the other of said electrodes having a wire secured to its outer end by means of a swiveled connection, said wire having a clip electrically connected to its other end providing for readily grounding said wire and electrode, and cooperating scale means carried by said body members for interpreting the conditions under test in accordance with the maximum length of said spark gap jumped by a spark under predetermined operating conditions.

9. A testing device of the character described comprising, in combination a pair of body members adapted for threaded telescoping engagement with each other, each of said body members having a hollow central chamber open at its end adjacent the other said body member, each of said body members having an electrode mounted in the closed end thereof and extending into the chamber therein, said electrodes providing a spark gap adjustable in accordance with the relative rotation of said body members at the threaded connection therebetween, means providing a transverse aperture through one of said body members and overlying the inner end of the electrode in said body member for viewing said spark gap, means providing an exposed terminal for the outer end of one of said electrodes, means providing for readily grounding the outer end of the other of said electrodes, means providing for removably connecting an electrical resistance in shunt with said spark gap, and scale means circumferentially arranged on one of said body members cooperating with an index marker carried by the other of said body members, said scale means comprising a single set of indicia calibrated to determine the peak voltage developed across said spark gap with said electrodes adjusted to the maximum gap containuously jumped by a spark with said resistance disconnected and to determine the peak current passing through said resistance device when the resistance device is connected in shunt with said spark gap and with said electrodes adjusted to the maximum gap continuously jumped by a spark.

10. A testing device of the character described comprising, in combination a pair of body members adapted for threaded telescoping engagement with each other, each of said body members having a hollow central chamber open at its end adjacent the other said body member, each of said body members having an electrode mounted in the closed end thereof and extending into the chamber therein, said electrodes providing a spark gap adjustable in accordance with the relative rotation of said body members at the threaded connection therebetween, means providing a transverse aperture through one of said body members and overlying the inner end of the electrode in said body member for viewing said spark gap, one of said electrodes extending out from its said body member, means providing for readily grounding the end of the other of said electrodes, said electrodes being spaced from the inner walls of said chambers in said body members and leaving an annular space, an annular electrical resistance device adapted to be positioned in said annular space, spring contacts between each end of said resistance device and the adjacent electrode providing for relative rotation of said electrodes and resistance device while maintaining electrical contact therebetween, and scale means carried by one of said body members cooperating with an index mark carried by the other body member and calibrated to determine the peak current passing through said resistance device when said electrodes are adjusted to the maximum gap continuously jumped by a spark.

11. A testing device of the character described comprising, in combination, a pair of body members adapted for threaded telescoping engagement with each other, each of said body members having a hollow central chamber open at its end adjacent the other said body member, each of said body members having an electrode mounted in the closed end thereof and extending into the chamber therein, said electrodes providing a spark gap adjustable in accordance with the relative rotation of said body members at the threaded connection therebetween, means providing a transverse aperture through one of said body members and overlying the inner end of the electrode in said body member for viewing said spark gap, one of said electrodes being spaced from the inner wall of the chamber in its said body member and leaving an annular space, an annular electrical resistance device adapted to be positioned in said annular space, and terminal means at opposite ends of said resistance adapted upon insertion in said body members for automatic contact with said electrodes in shunt across said gap.

CHARLES W. McCOY.

REFERENCES CITED

The following references are of record in the file of this patent:

UNITED STATES PATENTS

| Number | Name | Date |
| --- | --- | --- |
| 1,110,475 | Baier | Sept. 15, 1914 |
| 1,735,593 | Zitzmann | Nov. 12, 1929 |
| 1,991,451 | Elderkin | Feb. 19, 1935 |
| 2,076,618 | Cooper | Apr. 13, 1937 |
| 2,254,080 | McCarty | Aug. 26, 1941 |